US012773895B2

(12) United States Patent
Wada et al.

(10) Patent No.: US 12,773,895 B2
(45) Date of Patent: Oct. 27, 2026

(54) SEALING MEMBER AND DIE

(71) Applicant: NISHIKAWA RUBBER CO., LTD., Hiroshima (JP)

(72) Inventors: Hideki Wada, Hiroshima (JP); Noriyasu Kurahashi, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 61 days.

(21) Appl. No.: 18/821,103

(22) Filed: Aug. 30, 2024

(65) Prior Publication Data

US 2025/0128584 A1 Apr. 24, 2025

(30) Foreign Application Priority Data

Sep. 14, 2023 (JP) ................................ 2023-149637

(51) Int. Cl.
*B60J 10/21* (2016.01)

(52) U.S. Cl.
CPC .................................... *B60J 10/21* (2016.02)

(58) Field of Classification Search
None
See application file for complete search history.

(56) References Cited

U.S. PATENT DOCUMENTS 4,918,867 A * 4/1990 Hayashi ................... B60J 10/22 49/490.1
6,012,760 A * 1/2000 Nozaki ............. B29C 45/14409 296/206
6,616,878 B2 * 9/2003 Harada ............... B29C 66/1142 156/304.6
6,783,171 B2 * 8/2004 Teishi ...................... B60J 10/21 49/482.1
6,964,133 B2 * 11/2005 Aritake .................... B60J 10/21 49/441
8,572,897 B2 * 11/2013 Dishman ................. B60J 10/86 49/377
10,272,757 B2 * 4/2019 Nawate .................... B60J 10/22
10,953,736 B2 * 3/2021 Shibata .................. B60J 10/235
11,155,012 B2 * 10/2021 Groters .................... B60J 10/36
11,235,711 B2 * 2/2022 Takeda .................... B60R 13/06
11,241,945 B2 * 2/2022 Takeda ..................... B60J 10/76
(Continued)

FOREIGN PATENT DOCUMENTS

DE 102022100795 A1 * 7/2022 .............. B60J 10/76
EP 3075586 A1 * 10/2016 .............. B60J 10/21
(Continued)

*Primary Examiner* — Catherine A Kelly
(74) *Attorney, Agent, or Firm* — Procopio, Cory, Hargreaves & Savitch LLP

(57) ABSTRACT

A sealing member for a door of a vehicle, comprising an extrusion-molded part and a die-formed part, wherein the extrusion-molded part includes an attaching portion with a U-shaped cross section that has a protrusion portion, and the die-formed part is molded by using a die including an elongated holding die, and wherein the holding die includes a first holding portion, a second holding portion, and a guiding portion having a cross section progressively decreasing in a direction away from the cavity, and the protrusion portion is not provided in a section of the extrusion-molded part corresponding to the second holding portion and the guiding portion.

3 Claims, 14 Drawing Sheets

(56) References Cited

U.S. PATENT DOCUMENTS

| | | | | |
|---|---|---|---|---|
| 11,760,178 | B2 * | 9/2023 | Miyata | B29C 48/0022 49/493.1 |
| 12,269,324 | B2 * | 4/2025 | Ogawa | B60J 10/24 |
| 12,291,086 | B2 * | 5/2025 | Sasaki | B60J 10/86 |
| 2005/0208232 | A1 * | 9/2005 | Kimura | B29C 45/14467 264/250 |
| 2016/0114658 | A1 | 4/2016 | Yokota et al. | |
| 2022/0080816 | A1 * | 3/2022 | Hishida | B60J 10/88 |
| 2023/0166589 | A1 * | 6/2023 | Sasaki | B60J 10/86 49/475.1 |

FOREIGN PATENT DOCUMENTS

| | | | | | |
|---|---|---|---|---|---|
| JP | 01052548 | A | * | 2/1989 | |
| JP | H075024 | B2 | * | 1/1995 | B29C 45/14467 |
| JP | H075025 | B2 | * | 1/1995 | B60J 10/45 |
| JP | H07117075 | A | | 5/1995 | |
| JP | H0976763 | A | * | 3/1997 | B60J 10/79 |
| JP | 2002046476 | A | | 2/2002 | |
| JP | 2003048493 | A | * | 2/2003 | B60J 10/80 |
| JP | 2005262694 | A | | 9/2005 | |
| JP | 2006188106 | A | | 7/2006 | |
| JP | 3829421 | B2 | * | 10/2006 | B60J 10/21 |
| JP | 2016084055 | A | | 5/2016 | |

* cited by examiner

SEALING MEMBER AND DIE

CROSS REFERENCE TO RELATED APPLICATIONS

This application is based on Japanese patent application 2023-149637 filed on Sep. 14, 2023, the entire contents of which are incorporated herein by reference.

TECHNICAL FIELD

The present disclosure is related to a sealing member for a door of a vehicle and to a die used to form the sealing member.

BACKGROUND ART

A sealing member for a door of a vehicle is generally known, which includes an extrusion-molded part and a die-formed part, where the extrusion-molded part is inserted into a cavity of a die to seal the cavity, and a forming material is injected into the cavity to form the die-formed part, so that the extrusion-molded part and the die-formed part are connected.

For example, Japanese Laid-Open Patent Publication No. 2002-046476 discloses as such a sealing member a door glass run, which includes a glass run upper part serving as an extrusion-molded part, and a die-formed corner part, where the glass run upper part is inserted into a die to seal a cavity, and a rubber or resin material is injected into the cavity to form the die-formed corner part, so that the glass run upper part and the die-formed corner part are connected.

SUMMARY

In this respect, the extrusion-molded part in the sealing member may include an attaching portion with a U-shaped cross section that is configured to attach to sandwich a portion of a vehicle body. Such an attaching portion may often include, on an inner side thereof, a protrusion portion that protrudes from an opposing side of the U-shape in an opposing direction to engage the portion of the vehicle body inside the attaching portion.

In contrast, the die-formed part in the sealing member is typically formed such that at least a portion of the die-formed part is continuous with the attaching portion, where in order to stabilize, for example, a position of the attaching portion during forming in the die, a holding die often fills, inside the cavity, within the attaching portion with a U-shaped cross section to maintain the cross sectional shape of the attaching portion inserted into the cavity.

In this regard, when forming the die-formed part is only focused, it is contemplated sufficient that the holding die fills only a portion of the attaching portion that is located in the cavity during forming in the die. However, if the holding die stops filling within the attaching portion immediately outside the cavity, a forming material may leak to the outside of the cavity to cause what is called an overlap in which the leaked forming material covers the extrusion-molded part.

Then again, when the holding die fills within the attaching portion even outside the cavity, from a perspective of preventing the leak of the forming material, the protrusion portion of the attaching portion may be caught by the holding die to hamper removal of the extrusion-molded part from the die after forming in the die, and the protrusion portion and the holding die may become tight to hamper insertion of the extrusion-molded part into the cavity. There are thus issues that operations of inserting the extrusion-molded part into the cavity and removing the extrusion-molded part from the die after forming in the die may have to be performed relying on intuition and/or knack of certain skilled operators, leading to human resource constraints and further to reduced production efficiency.

The present disclosure is made in view of the foregoing and an object of the present disclosure is to provide a sealing member and a die that, when a die-formed part is formed, allow for ease of inserting an extrusion-molded part into a cavity and of removing the extrusion-molded part from a die after forming in the die, while reducing leakage of a forming material.

To achieve the object, in the sealing member and die according to the present disclosure, the extrusion-molded part has an attaching portion including a protrusion portion, the protrusion portion omitted in a predetermined section from the boundary with the die-formed part, and a holding die in the predetermined section is formed to have a shape corresponding to the attaching portion lacking the protrusion portion.

Specifically, the present disclosure is directed to a sealing member for a door of a vehicle, comprising an extrusion-molded part and a die-formed part.

The extrusion-molded part includes an attaching portion with a U-shaped cross section that has a protrusion portion protruding from an opposing side of the U-shape in the opposing direction, and the die-formed part is molded so that at least a portion of which is continuous with the attaching portion by using a die including an elongated holding die that holds the extrusion-molded part so as to fit into the attaching portion, and a cavity, and by injecting a forming material into the cavity that is sealed by inserting the extrusion-molded part along a longitudinal direction of the holding die, and wherein the holding die includes a first holding portion configured to fill within the attaching portion inside the cavity to maintain a cross sectional shape of the attaching portion, a second holding portion being continuous with the first holding portion in the longitudinal direction and configured to fill within the attaching portion outside the cavity, and a guiding portion being continuous with the second holding portion in the longitudinal direction and having a cross section progressively decreasing in a direction away from the cavity, and the protrusion portion is not provided in a section of the extrusion-molded part corresponding to the second holding portion and the guiding portion.

According to this configuration, when the extrusion-molded part is inserted to seal the cavity, and the forming material is injected into the cavity to form the die-formed part including at least the portion continuous with the attaching portion, the holding die including the second holding portion configured to fill within the attaching portion outside the cavity is used to be able to reduce leakage of the forming material outward of the cavity.

Also, no protrusion portion is provided in the section of the extrusion-molded part corresponding to the second holding portion and the guiding portion, so that the extrusion-molded part is easily removed from the holding die after forming in the die, even in the presence of the second holding portion and the guiding portion provided for reducing leakage of the forming material.

Further, the fact that the second holding and guiding portions do not become tight with the protrusion portion due to the absence of the protrusion portion in the section of the extrusion-molded part corresponding to the second holding portion and the guiding portion, and the fact that the guiding portion has a cross section progressively decreasing in a direction away from the cavity allow the extrusion-molded part to be easily inserted onto the die.

As described above, according to the sealing member of the present disclosure, when the die-formed part is formed, the extrusion-molded part can be easily inserted into the cavity and removed from the die after forming in the die, while reducing leakage of the forming material.

Also, in the sealing member, the extrusion-molded part is a glass run upper part configured to be installed on a frame upper part of a window frame of a vehicle, the die-formed part is a corner part connected with a rear end of the glass run upper part, the attaching portion is configured to attach to sandwich an attachable portion protruding from the frame upper part outward of the vehicle, and the protrusion portion protrudes in the direction of sandwiching the attachable portion to be caught by a plurality of hooks provided in the attachable portion at intervals in a longitudinal direction of the attachable portion.

This configuration enables a glass run, with which when the corner part connected with the rear end of the glass run upper part is formed in the die, the glass run upper part serving as the extrusion-molded part can be easily inserted into the cavity, and the glass run upper part can be easily removed from the holding die after forming in the die.

Further, in the sealing member, the section corresponding to the second holding portion and the guiding portion has a length of less than or equal to 10 mm.

The plurality of hooks configured to catch the protrusion portion are provided at intervals in the attachable portion that protrudes from the frame upper part outward of the vehicle. According to the configuration, the section lacking the protrusion portion is reduced to be less than or equal to 10 mm to lower the probability of coinciding a part having the hooks with a part lacking the protrusion portion, thus ensuring that the protrusion portion is caught by the hooks.

The present disclosure is also directed to a die for forming a die-formed part that is in a sealing member for a door of a vehicle and connects with an extrusion-molded part having an attaching portion with a U-shaped cross section.

The die then comprises an elongated holding die configured to fit in the attaching portion to hold the extrusion-molded part, and a cavity, wherein the die-formed part is molded so that at least a portion of it is continuous with the attaching portion by injecting a forming material into the cavity that is sealed by inserting the extrusion-molded part along a longitudinal direction of the holding die, and the holding die includes a first holding portion having a rectangular cross sectional shape and configured to fill within the attaching portion inside the cavity to maintain a cross sectional shape of the attaching portion, a second holding portion having a rectangular cross sectional shape, being continuous with the first holding portion in the longitudinal direction, and configured to fill within the attaching portion outside the cavity, and a guiding portion being continuous with the second holding portion in the longitudinal direction and having a cross section progressively decreasing in a direction away from the cavity.

According to this configuration, when the die-formed part is formed, the second holding portion having the rectangular cross sectional shape fills within the attaching portion outside the cavity, so that leakage of the forming material outward of the cavity can be reduced and the attaching portion of the extrusion-molded part can be easily removed from the second holding portion having the rectangular cross sectional shape after forming in the die.

Further, the second holding portion is formed to have the rectangular cross sectional shape that is not a complex shape, as well as the guiding portion has the cross section progressively decreasing in a direction away from the cavity, so that the extrusion-molded part can be easily inserted onto the cavity.

As described above, according to the sealing member and the die of the present disclosure, when the die-formed part is formed, the extrusion-molded part can be easily inserted into the cavity and removed from the die after forming in the die, while reducing leakage of the forming material.

DESCRIPTION OF EMBODIMENTS

Embodiments of the present disclosure are described below with reference to the drawings.

Glass Run

Figure 1:
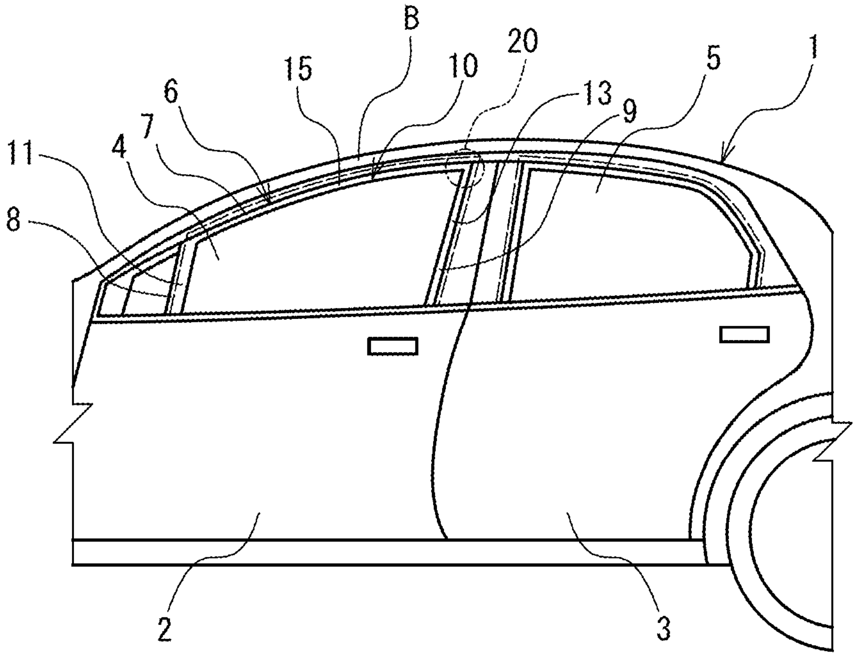
FIG. 1 is a view schematically showing a vehicle to which a glass run according to an embodiment of the present disclosure is applied.
Figure 2:
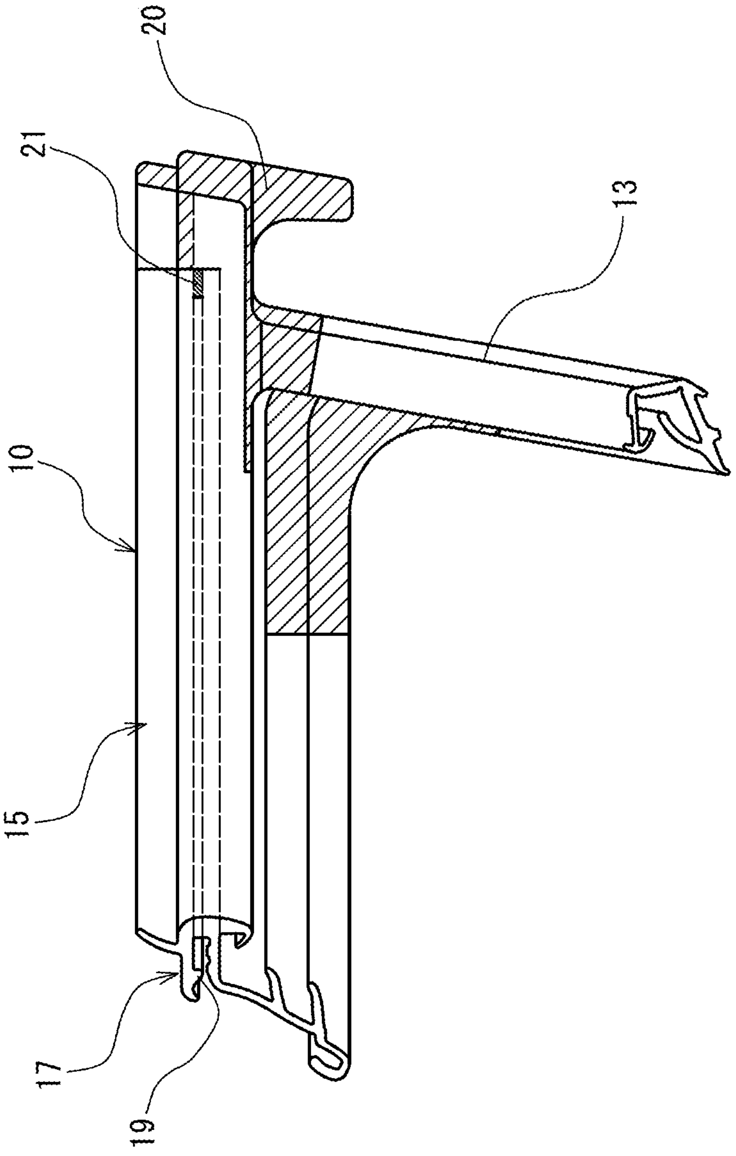
FIG. 2 is a view schematically showing main parts of the glass run.

FIG. 1 is a view schematically showing a vehicle 1 to which a glass run 10 according to an embodiment is applied and FIG. 2 is a view schematically showing main parts of the glass run 10. A window frame 6 forms a window opening in a front door 2 and is configured to function as a sash for supporting a periphery of a front door glass 4. As shown in FIG. 1, the glass run 10 is a sealing member for a door of the vehicle 1, and is configured to be installed on the window frame 6 of the front door 2 to act to, for example, provide watertightness and airtightness between the front door glass 4 and the window frame 6, guide upward and downward movements of the front door glass 4, and reduce rattling of the front door glass 4. This glass run 10 is particularly called a hiding type and configured to be installed on the window frame 6 from an outside of the vehicle to cover and hide a frame upper part 7 extending in a top part of the window frame 6 in a front-to-back direction of the vehicle.

The glass run 10 includes a glass run front vertical part 11 mounted to a frame front vertical part 8 extending in a front part of the window frame 6 in a vertical direction, a glass run rear vertical part 13 mounted to a frame rear vertical part 9 extending in a rear part of the window frame 6 in the vertical direction, and a glass run upper part 15 configured to cover the frame upper part 7, as shown in FIG. 1, and a corner part 20 connected with a rear end of the glass run upper part 15 and an upper end of the glass run rear vertical part 13, as shown with a hatch pattern in FIG. 2.

The glass run front vertical part 11, the glass run rear vertical part 13, and the glass run upper part 15 are an extrusion-molded part formed by extrusion molding of an elastic material including a thermoplastic elastomer (TPE), such as a styrenic thermoplastic elastomer (TPS), an olefinic thermoplastic elastomer (TPO), and a hard resin material including, for example, polypropylene (PP) containing talc, polypropylene (PP) containing glass fibers.

In contrast, the corner part 20 is a die-formed part formed by setting on a die 30 (see FIG. 4A, FIG. 4B, FIG. 4C, FIG. 4D, and FIG. 4E) the upper end of the glass run rear vertical part 13 and the rear end of the glass run upper part 15 previously extrusion molded, and injecting an elastic material, such as a resin, rubber.

Thus, the glass run 10 according to the embodiment includes the glass run front vertical part 11, the glass run rear vertical part 13, and the glass run upper part 15 serving as the extrusion-molded parts, and the corner part 20 serving as the die-formed part.

Attachment of Glass Run Upper Part to Window Frame

Figure 3:
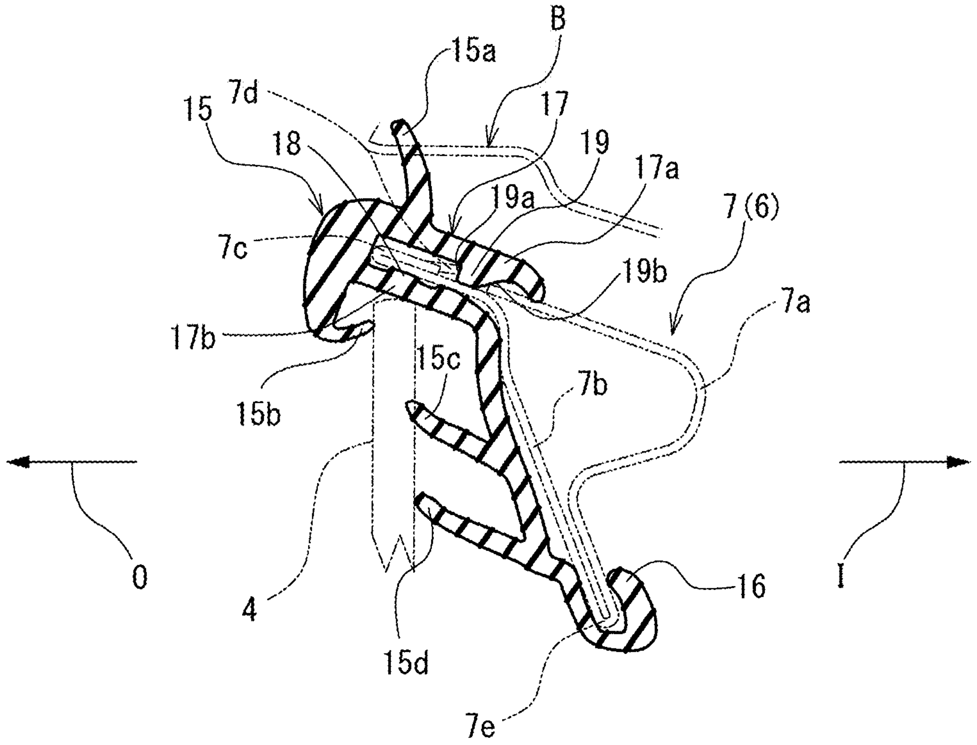
FIG. 3 is a cross-sectional view schematically depicting attachment of a glass run upper part to a window frame.

FIG. 3 is a cross-sectional view schematically depicting attachment of the glass run upper part 15 to the window frame 6. In FIG. 3, an arrow O represents an outside of the vehicle and an arrow I represents an inside of the vehicle. As shown in FIG. 3, the frame upper part 7 of the window frame 6 is configured to layer an inner panel 7*a* and an outer panel 7*b* and includes an upper flange 7*c* protruding outward of the vehicle and a lower flange 7*e* protruding downward. The upper flange (attachable portion) 7*c* includes hooks 7*d* provided at intervals at several locations thereof in a longitudinal direction of the frame upper part 7.

The glass run upper part 15 includes an attaching portion 17 with a U-shaped cross section and having an upper side 17*a* and a lower side 17*b* opposing each other. The attaching portion 17 includes a protrusion portion 19 protruding significantly from the upper side 17*a* (an opposing side in the U-shape) toward the lower side 17*b* in an opposing direction. The attaching portion 17 also includes two holding lips 18 subtly bulging from the lower side 17*b* toward the upper side 17*a* in the opposing direction. The attaching portion 17 is configured to attach to the frame upper part 7 to sandwich the upper flange 7*c* protruding from the frame upper part 7 outward of the vehicle. The protrusion portion 19, which protrudes in a direction of sandwiching the upper flange 7*c*, is configured to engage the upper flange 7*c* such that when the attaching portion 17 sandwiches the upper flange 7*c*, an engageable surface 19*a* extending generally straight in the opposing direction is caught by the hooks 7*d* of the frame upper part 7.

The glass run upper part 15 also includes a molding lip 16 with a U-shaped cross section and the molding lip 16 is configured to engage the lower flange 7*e*. In this way, the fact that the molding lip 16 engages the lower flange 7*e* and the fact that the attaching portion 17 engages the upper flange 7*c* due to the engageable surface 19*a* of the protrusion portion 19 caught by the hooks 7*d* allow the glass run upper part 15 to be firmly attached to (installed on) the frame upper part 7.

Further, the glass run upper part 15 includes a lip portion 15*a* formed to extend upward, and when the front door 2 is closed, the lip portion 15*a* abuts on a vehicle body B to seal between the front door 2 and the vehicle body B. The glass run upper part 15 also includes lip portions 15*b*, 15*c*, and 15*d*, and when the front door glass 4 is raised to abut on the glass run upper part 15, the lip portions 15*b*, 15*c*, and 15*d* contact with the front door glass 4 to seal the front door glass 4.

Die

Figure 4A:
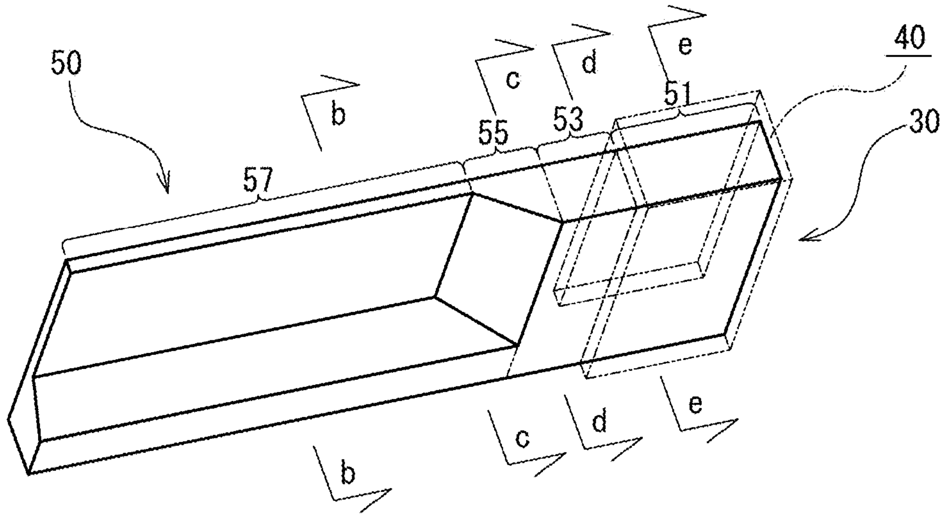
FIG. 4A is a perspective view schematically showing a holding die.
Figure 4B:
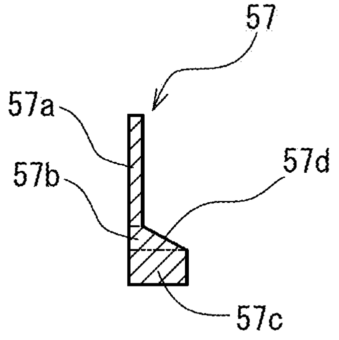
FIG. 4B is a cross-sectional view taken along the line b-b in FIG. 4A in the direction of the arrow.
Figure 4C:
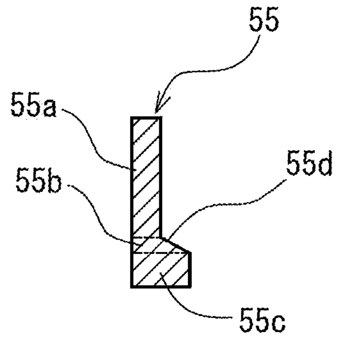
FIG. 4C is a cross-sectional view taken along the line c-c in FIG. 4A in the direction of the arrow.
Figure 4D:
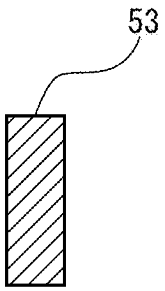
FIG. 4D is a cross-sectional view taken along the line d-d in FIG. 4A in the direction of the arrow.
Figure 4E:
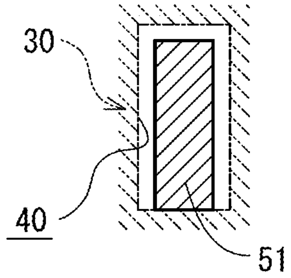
FIG. 4E is a cross-sectional view taken along the line e-e in FIG. 4A in the direction of the arrow.
Figure 5:
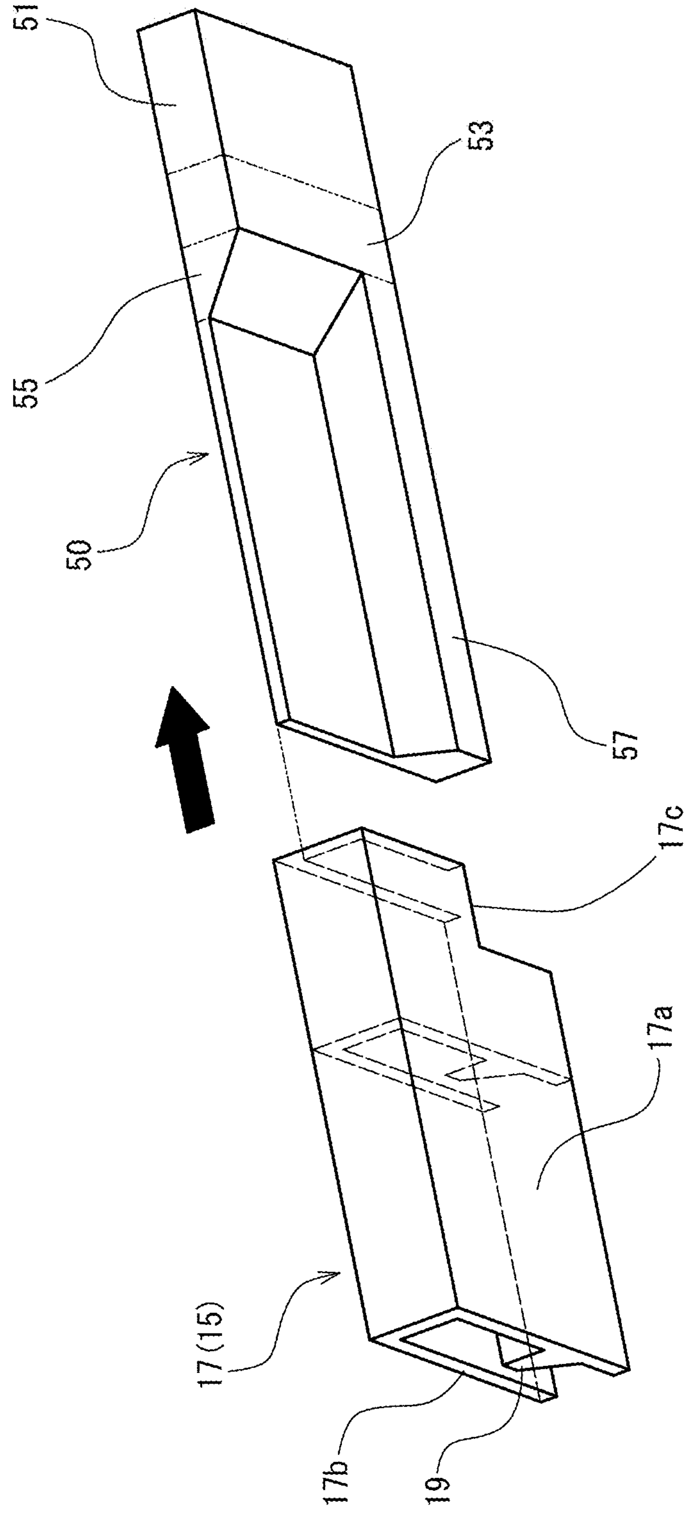
FIG. 5 is a perspective view schematically depicting insertion of an attaching portion onto the holding die.

FIG. 4A, FIG. 4B, FIG. 4C, FIG. 4D, and FIG. 4E are views schematically showing a holding die 50, FIG. 5 is a perspective view schematically depicting insertion of the attaching portion 17 onto the holding die 50, and FIG. 6A, FIG. 6B, FIG. 6C, FIG. 6D, and FIG. 6E are views schematically depicting relationship between the holding die 50 and the attaching portion 17. For ease of illustration, FIG. 4A only shows the holding die 50 and a cavity 40 in a die 30. Also, for ease of illustration, FIG. 4E and FIG. 6E only shows the holding die 50, the cavity 40, and a portion segmenting the cavity 40 in the die 30. Further, for ease of illustration, FIG. 5, FIG. 6A, FIG. 6B, FIG. 6C, FIG. 6D, and FIG. 6E are shown by having the holding lips 18 omitted to simplify the attaching portion 17.

Figure 6A:
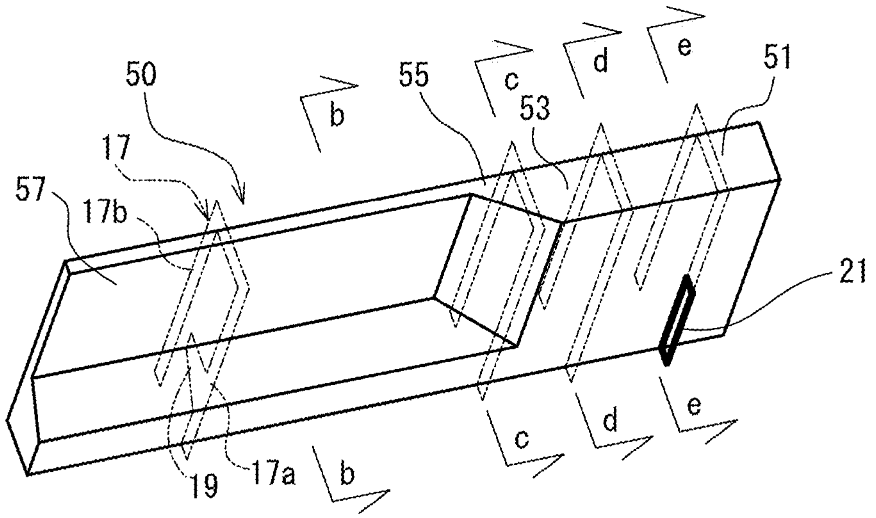
FIG. 6A is a perspective view schematically depicting relationship between the holding die and the attaching portion.

As shown in FIG. 4A and FIG. 6A, the die 30 used for forming a corner part 20 includes the elongated holding die 50 and the cavity 40, the holding die 50 configured to fit in the attaching portion 17, having the U-shaped cross section, to hold the glass run upper part 15. As shown in FIG. 5, the glass run upper part 15 held by the holding die 50 has a rear end that includes a cutout 17*c*, in which a portion of the upper side 17*a* including the protrusion portion 19 is cut out.

As shown in FIG. 4A, the holding die 50 includes a first holding portion 51 located inside the cavity 40, a second holding portion 53 being continuous with the first holding portion 51 in a longitudinal direction and located outside the cavity 40, a guiding portion 55 being continuous with the second holding portion 53 in the longitudinal direction and located away from the cavity (the left side in FIG. 4A) than the second holding portion 53, and a general portion 57 being continuous with the guiding portion 55 in the longitudinal direction and located further away from the cavity than the guiding portion 55.

Figure 6B:
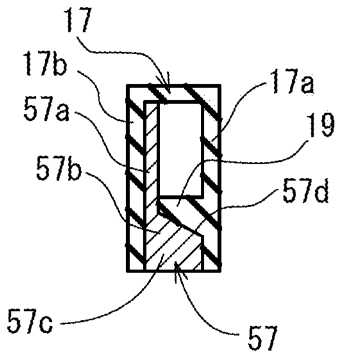
FIG. 6B is a cross-sectional view taken along the line b-b in FIG. 6A in the direction of the arrow.

As shown in FIG. 4B, the general portion 57 is formed to have a cross sectional shape in which a first region 57*a* having a rectangular cross sectional shape, a second region 57*b* having a trapezoidal cross sectional shape, and a third region 57*c* having a rectangular cross sectional shape are connected in that order. More particularly, as shown in FIG. 6B, the first region 57*a* is formed to have the elongated rectangular cross sectional shape that has a width generally same as a spacing between the protrusion portion 19 protruding from the upper side 17*a* and the lower side 17*b*. The third region 57*c* is formed to have the rectangular cross sectional shape that has a width generally same as a spacing between the upper side 17*a* and the lower side 17*b*. The second region 57*b* is formed to have the trapezoidal cross sectional shape that has an upper base having a width same as the first region 57*a*, a lower base having a width same as the third region 57*c*, and an inclined surface 57*d* inclined at an angle same as a sloping surface 19*b* of the protrusion portion 19.

The general portion 57 is formed to have such cross sectional shape, so that as shown with a black arrow in FIG. 5, when the attaching portion 17 (glass run upper part 15) is pushed onto from a general portion 57 side along the longitudinal direction of the holding die 50, the general portion 57 is smoothly inserted inside the attaching portion 17 having the U-shaped cross section, as shown in FIG. 6B.

Figure 6C:
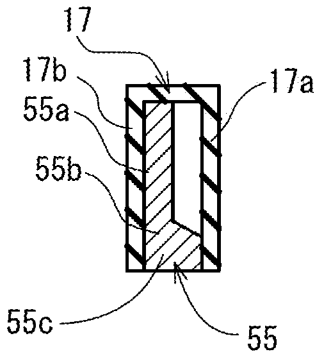
FIG. 6C is a cross-sectional view taken along the line c-c in FIG. 6A in the direction of the arrow.

The first holding portion 51 is formed to have a rectangular cross sectional shape that has a width generally same as the spacing between the upper side 17*a* and the lower side 17*b*, and as shown in FIG. 4E, the cavity 40 having an U-shaped cross section is formed between the die 30 and a main part. When the attaching portion 17 having the U-shaped cross section, in which the portion of the upper side 17*a* including the protrusion portion 19 is cut out, is pushed onto from the general portion 57 side along the longitudinal direction of the holding die 50, the cavity 40 having the U-shaped cross section is thus sealed and the first holding portion 51 fills within the attaching portion 17 inside the cavity 40 to maintain the cross sectional shape of the attaching portion 17. When an elastic material, such as a resin, rubber, is then injected into the sealed cavity 40, the elastic material fills up the portion of the upper side 17*a* that is cut out due to the provided cutout 17*c*, and a portion 21 of the corner part 20 is formed to be continuous with the attaching portion 17 having its cross sectional shape maintained, as shown in FIG. 6E. The second holding portion 53 and the guiding portion 55 are described below in detail.

Issues of Holding Die and Attaching Portion in Prior Art

For ease of understanding the embodiment, issues of holding dies and attaching portions in prior art are explained before describing the second holding portion 53 and the guiding portion 55.

Figure 7A:
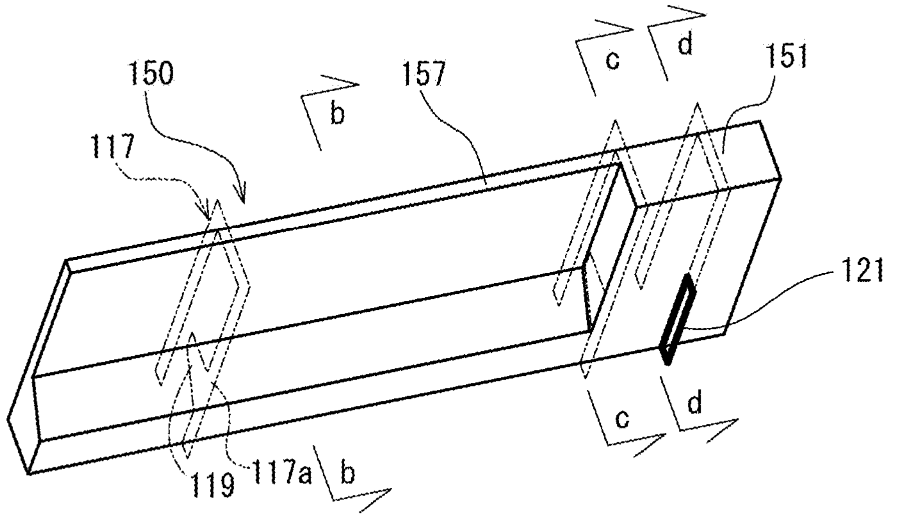
FIG. 7A (PRIOR ART)
FIG. 7A is a perspective view schematically depicting relationship between a holding die and an attaching portion in prior art 1.
Figure 7B:
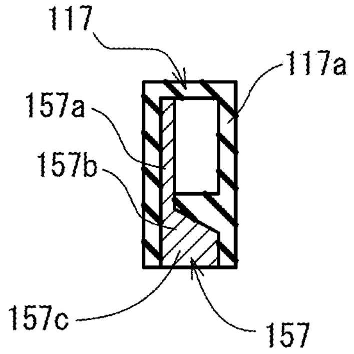
FIG. 7B (PRIOR ART)
FIG. 7B is a cross-sectional view taken along the lines b-b in FIG. 7A in the direction of the arrow.

FIG. 7A, FIG. 7B, FIG. 7C, and FIG. 7D are views schematically depicting relationship between a holding die 150 and an attaching portion 117 in prior art 1. In the holding die 150 of the prior art 1, a general portion 157 is also formed to have a cross sectional shape in which a first region 157*a* having a rectangular cross sectional shape, a second region 157*b* having a trapezoidal cross sectional shape, and a third region 157*c* having a rectangular cross sectional shape are connected in that order, as in the holding die 50 of the embodiment. This allows the general portion 157 to be smoothly inserted inside the attaching portion 117, as shown in FIG. 7B, when the attaching portion 117 is pushed onto along the longitudinal direction of the holding die 150.

Figure 7C:
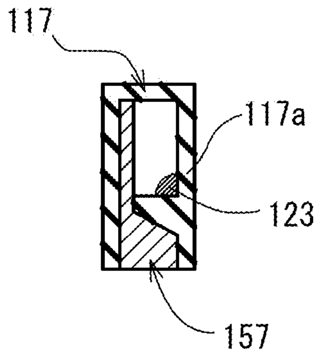
FIG. 7C (PRIOR ART)
FIG. 7C is a cross-sectional view taken along the lines c-c in FIG. 7A in the direction of the arrow.
Figure 7D:
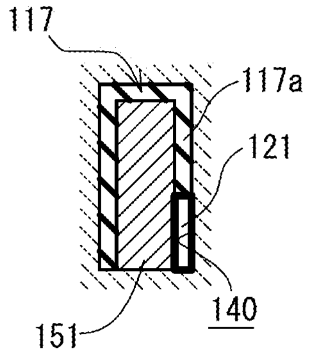
FIG. 7D (PRIOR ART)
FIG. 7D is a cross-sectional view taken along the line d-d in FIG. 7A in the direction of the arrow.

In the holding die 150 of the prior art 1, a first holding portion 151 having a rectangular cross sectional shape also fills within the attaching portion 117 inside a cavity 140 to maintain the cross sectional shape of the attaching portion 117, and this allows a corner part 121 to form to be continuous with the attaching portion 117 having its cross sectional shape maintained, as shown in FIG. 7D.

In this regard, when forming the corner part 121 is only focused, it is contemplated sufficient that the first holding portion 151 fills only a portion of the attaching portion 117 that is located in the cavity 140 during forming in the die. Specifically, it is deemed that the corner part 121 may be formed in the die by using the holding die 150 in which the first holding portion 151 located inside the cavity 140, and the general portion 157 located away from the cavity than the first holding portion 151 are continuous in the longitudinal direction, as shown in FIG. 7A.

On the contrary, when the holding die 150 stops filling within the attaching portion 117 immediately outside the cavity 140 as in the holding die 150 of the prior art 1, a forming material 123 may leak, for example, from a base portion of a protrusion portion 119 of an upper side 117*a* toward a side away from the cavity, as shown in FIG. 7C, and cause what is called an overlap in which the leaked forming material 123 covers a glass run upper part that is an extrusion-molded part.

For that reason, from a perspective of preventing the leakage of the forming material to reduce the overlap, it is contemplated that the holding die also fills within the attaching portion outside the cavity. FIG. 8A, FIG. 8B, FIG. 8C, FIG. 8D, and FIG. 8E are views schematically showing a holding die 250 in prior art 2 and FIG. 9A, FIG. 9B, FIG. 9C, FIG. 9D, and FIG. 9E are views schematically depicting relationship between the holding die 250 and an attaching portion 217 in the prior art 2.

Figure 8A:
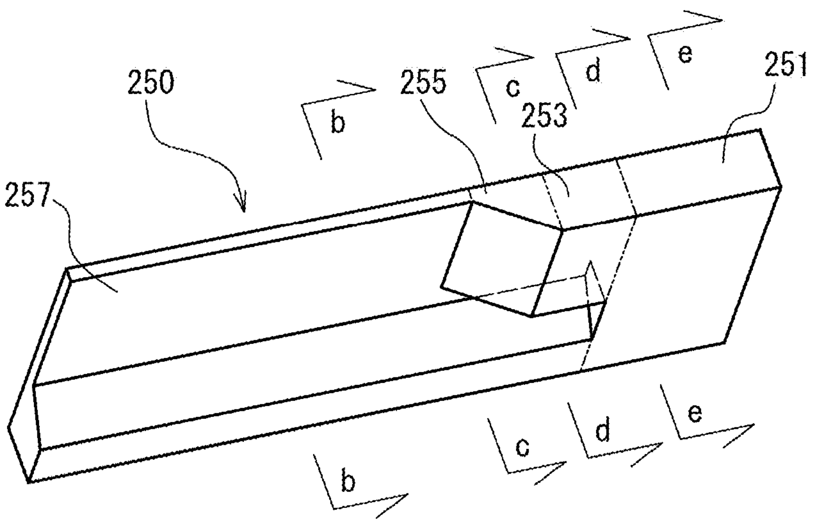
FIG. 8A (PRIOR ART)
FIG. 8A is a perspective view schematically showing a holding die in prior art 2.
Figure 9A:
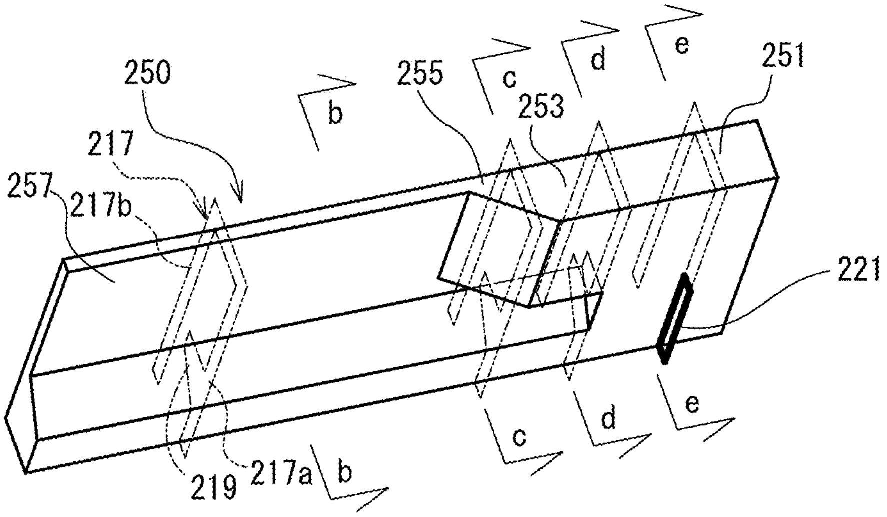
FIG. 9A (PRIOR ART)
FIG. 9A is a perspective view schematically depicting relationship between the holding die and an attaching portion in prior art 2.

As shown in FIG. 8A and FIG. 9A, the holding die 250 includes a first holding portion 251 located inside a cavity 240, a second holding portion 253 being continuous with the first holding portion 251 in the longitudinal direction and located outside the cavity 240, a guiding portion 255 being continuous with the second holding portion 253 in the longitudinal direction and located away from the cavity than the second holding portion 253, and a general portion 257 being continuous with the guiding portion 255 in the longitudinal direction and located further away from the cavity than the guiding portion 255.

Figure 8B:
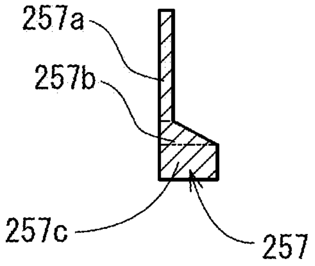
FIG. 8B (PRIOR ART)
FIG. 8B is a cross-sectional view taken along the line b-b in FIG. 8A in the direction of the arrow.

As shown in FIG. 8B, the general portion 257 is also formed to have a cross sectional shape in which a first region 257*a* having a rectangular cross sectional shape, a second region 257*b* having a trapezoidal cross sectional shape, and a third region 257*c* having a rectangular cross sectional shape are connected in that order, as in the holding die 50 of the embodiment and the holding die 150 of the prior art 1.

Figure 9B:
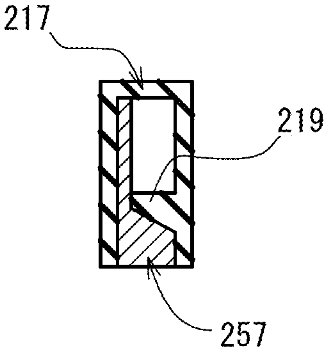
FIG. 9B (PRIOR ART)
FIG. 9B is a cross-sectional view taken along the line b-b in FIG. 9A in the direction of the arrow.

This allows the general portion 257 to be smoothly inserted inside the attaching portion 217, as shown in FIG. 9B.

Figure 8C:
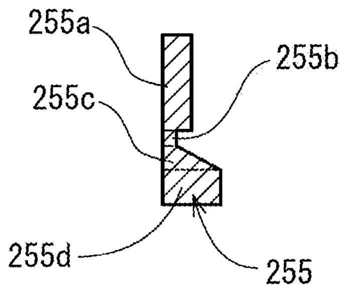
FIG. 8C (PRIOR ART)
FIG. 8C is a cross-sectional view taken along the line c-c in FIG. 8A in the direction of the arrow.
Figure 8D:
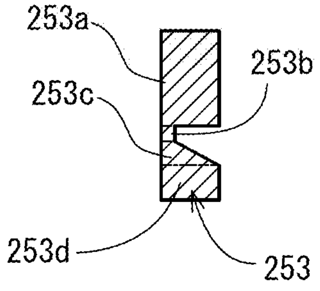
FIG. 8D (PRIOR ART)
FIG. 8D is a cross-sectional view taken along the line d-d in FIG. 8A in the direction of the arrow.
Figure 8E:
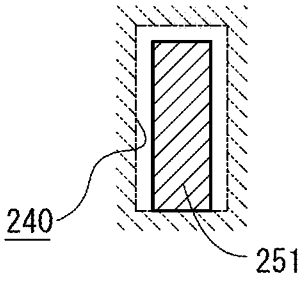
FIG. 8E (PRIOR ART)
FIG. 8E is a cross-sectional view taken along the line e-e in FIG. 8A in the direction of the arrow.

As shown in FIG. 8E, the first holding portion 251 is also formed to have a rectangular cross sectional shape that has a width generally same as a spacing between an upper side 217*a* and a lower side 217*b*. The first holding portion 251 thus fills within the attaching portion 217 inside a cavity 240 to maintain the cross sectional shape of the attaching portion 217, and this allows a corner part 221 to form to be continuous with the attaching portion 217 having its cross sectional shape maintained, as shown in FIG. 9E.

The second holding portion 253 has a similar shape to an inner space of the attaching portion 217 to fill the attaching portion 217 outside the cavity 240. Specifically, as shown in FIG. 8D, the second holding portion 253 is formed to have a cross sectional shape in which a first region 253*a* having a rectangular cross sectional shape that has a width generally same as the spacing between the upper side 217*a* and the lower side 217*b*, a second region 253*b* having a rectangular cross sectional shape that has a width same as the first region 257*a* of the general portion 257, a third region 253*c* having a shape same as the second region 257*b* of the general portion 257 (trapezoidal cross sectional shape), and a fourth region 253*d* having a shape same as the third region 257*c* of the general portion 257 (rectangular cross sectional shape) are connected in that order.

As shown in FIG. 8C, the guiding portion 255 is formed to have a cross sectional shape in which a first region 255*a* having a rectangular cross sectional shape that has a width progressively smaller from a width same as the first region 253*a* of the second holding portion 253 to a width same as the first region 257*a* of the general portion 257 in a direction away from the cavity, a second region 255*b* having a shape same as the second region 253*b* of the second holding portion 253 (rectangular cross sectional shape), a third region 255*c* having a shape same as the second region 257*b* of the general portion 257 and the third region 253*c* of the second holding portion 253 (trapezoidal cross sectional shape), and a fourth region 255*d* having a shape same as the third region 257*c* of the general portion 257 and the fourth region 253*d* of the second holding portion 253 (rectangular cross sectional shape) are connected in that order.

Figure 9C:
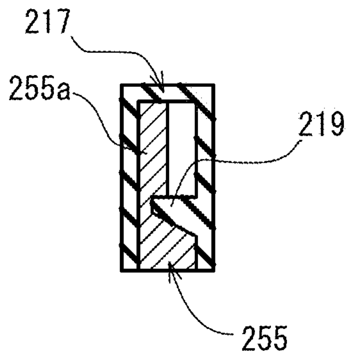
FIG. 9C (PRIOR ART)
FIG. 9C is a cross-sectional view taken along the line c-c in FIG. 9A in the direction of the arrow.

The holding die 250 of the prior art 2 configured as described above includes the second holding portion 253 (first region 253*a*), where the first region 253*a* also fills within the attaching portion 217 outside the cavity 240 as shown in FIG. 9C, so that unlike the holding die 150 of the prior art 1, leakage of a forming material can be reduced from a base portion of a protrusion portion 219 of the upper side 217*a* toward a side away from the cavity.

Figure 9D:
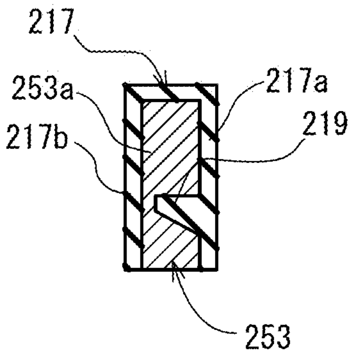
FIG. 9D (PRIOR ART)
FIG. 9D is a cross-sectional view taken along the line d-d in FIG. 9A in the direction of the arrow.
Figure 9E:
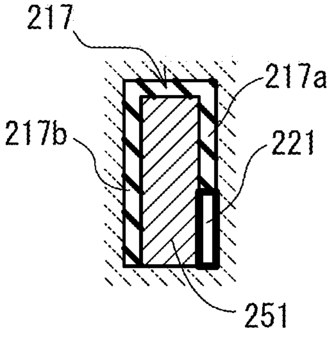
FIG. 9E (PRIOR ART)
FIG. 9E is a cross-sectional view taken along the line e-e in FIG. 9A in the direction of the arrow.

However, in the holding die 250 of the prior art 2, the protrusion portion 219 of the attaching portion 217 may be caught by the first region 253*a* of the second holding portion 253 and the first region 255*a* of the guiding portion 255 as shown in FIG. 9C and FIG. 9D to hamper removal of the glass run upper part from the die after forming in the die. In addition, the second holding portion 253 has a similar shape to the inner space of the attaching portion 217 and it is thus envisioned that the protrusion portion 219 and the holding die 250 become tight to hamper insertion of the glass run upper part (attaching portion 217) into the cavity 240. Operations of inserting the glass run upper part into the cavity 240 and removing the glass run upper part from the die after forming in the die may thus have to be performed relying on intuition and/or knack of certain skilled operators. This may lead to human resource constraints and further to reduced production efficiency.

Relationship Between Second Holding and Guiding Portions and Protrusion Portion

For that reason, in the embodiment, the protrusion portion 19 provided in the glass run upper part 15 serving as the extrusion-molded part is omitted in a predetermined section from the boundary with the corner part 20 serving as the die-formed part, and the holding die 50 in the predetermined section is formed to have a shape corresponding to the attaching portion 17 lacking the protrusion portion 19. Specifically, the glass run 10 according to the embodiment includes the glass run upper part 15 having no protrusion portion 19 in a section corresponding to the second holding portion 53 and guiding portion 55 (see FIG. 6A) and the die 30 according to the embodiment includes the second holding portion 53 formed to have a rectangular cross sectional shape.

Figure 6D:
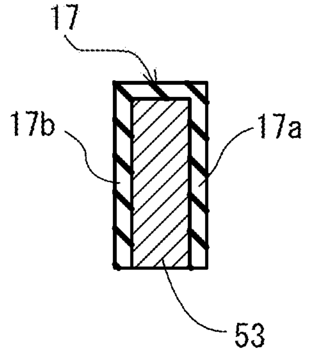
FIG. 6D is a cross-sectional view taken along the line d-d in FIG. 6A in the direction of the arrow.
Figure 6E:
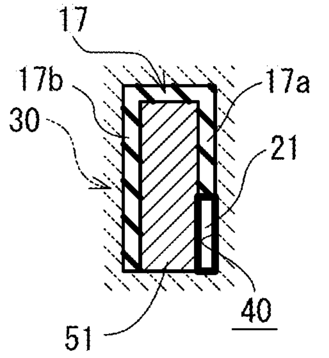
FIG. 6E is a cross-sectional view taken along the line e-e in FIG. 6A in the direction of the arrow.

More particularly, as shown in FIG. 6D, no protrusion portion 19 is provided in the section of the attaching portion 17 of the glass run upper part 15 corresponding to the second holding portion 53 to thus provide an inner space of the attaching portion 17 having a rectangular cross sectional shape. Correspondingly, as shown in FIG. 4D and FIG. 6D, the second holding portion 53 is formed to have a rectangular cross sectional shape that has a width generally same as the spacing between the upper side 17*a* and the lower side 17*b*. The second holding portion 53 is thus continuous in the longitudinal direction with the first holding portion 51 that has a rectangular cross sectional shape and fills within the attaching portion 17 inside the cavity 40 to maintain the cross sectional shape of the attaching portion 17, and the second holding portion 53 is then configured to fill within the attaching portion 17 outside the cavity 40 to maintain the cross sectional shape of the attaching portion 17.

Also, as shown in FIG. 6C, no protrusion portion 19 is provided in the section of the attaching portion 17 of the glass run upper part 15 corresponding to the guiding portion 55 to thus provide the inner space of the attaching portion 17 having a rectangular cross sectional shape. Although the guiding portion 55 is then contemplated to have a same rectangular cross sectional shape as the second holding portion 53 or a same cross sectional shape as the general portion 57, the guiding portion 55 is configured in the embodiment to have a cross section progressively decreasing in a direction away from the cavity, considering ease for inserting the glass run upper part 15.

Specifically, as shown in FIG. 4C, the guiding portion 55 is formed to have a cross sectional shape in which a first region 55*a* having a rectangular cross sectional shape, a second region 55*b* having a trapezoidal cross sectional shape, and a third region 55*c* having a rectangular cross sectional shape are connected in that order. The first region 55*a* is formed to be progressively smaller from a width same as the second holding portion 53 to a width and a height same as the first region 57*a* of the general portion 57 in a direction away from the cavity. The third region 55*c* is formed to have a shape same as the third region 57*c* of the general portion 57. The second region 55*b* includes an upper base having a width same as the first region 55*a*, a lower base having a width same as the third region 55*c*, and an inclined surface 55*d* inclined at an angle same as the sloping surface 19*b* of the protrusion portion 19, and is formed to be progressively elevated toward the side away from the cavity.

The second holding portion 53 preferably has a length of less than or equal to 5 mm in the longitudinal direction of the holding die 50 and the guiding portion 55 also has preferably a length of less than or equal to 5 mm. Thus, the section of the glass run upper part 15 having no protrusion portion 19, i.e., the section corresponding to the second holding portion 53 and the guiding portion 55 preferably has a length of less than or equal to 10 mm.

Function and Effect

According to the embodiment, when the glass run upper part 15 serving as the extrusion-molded part is inserted to seal the cavity 40, and a forming material is injected into the cavity 40 to form the corner part 20 that is continuous with the attaching portion 17, the second holding portion 53 fills within the attaching portion 17 outside the cavity 40 to be able to reduce leakage of the forming material outward of the cavity 40.

Also, no protrusion portion 19 is provided in the section of the attaching portion 17 of the glass run upper part 15 corresponding to the second holding portion 53 and the guiding portion 55, so that the attaching portion 17 is easily removed from the holding die 50 after forming in the die, even in the presence of the second holding portion 53 and the guiding portion 55 provided for reducing leakage of the forming material.

Further, no protrusion portion 19 is provided in the section of the attaching portion 17 of the glass run upper part 15 corresponding to the second holding portion 53 and the guiding portion 55 and thus, the second holding and guiding portions 53, 55 and the protrusion portion 19 do not become tight, so that the glass run upper part 15 is easily inserted onto the die 30, also owing to the fact that the guiding portion 55 has a cross section progressively decreasing in a direction away from the cavity. By way of one example, when the glass run upper part 15 is inserted onto the die 30, the insertion force of the holding die 50 according to the embodiment can be reduced to about 40% as compared to that of the holding die 250 of the prior art 2.

The hooks 7*d* configured to catch the protrusion portion 19 are then provided at intervals in the upper flange 7*c* that protrudes from the frame upper part 7 outward of the vehicle. In the embodiment, the section lacking the protrusion portion 19 is reduced to be less than or equal to 10 mm to lower the probability of coinciding a part having the hooks 7*d* with a part lacking the protrusion portion 19, thus ensuring that the protrusion portion 19 is caught by the hooks 7*d*.

Other Embodiment

The present disclosure is not limited to the embodiment and can be implemented in other various embodiments without departing from the spirit or key features thereof.

In the embodiment as described above, the present disclosure is applied to the glass run 10 for the front door glass 4 of the front door 2; however, the present disclosure is not limited to this configuration and, for example, the present disclosure may be applied to a glass run for a rear door glass 5 of a rear door 3.

Also, in the embodiment as described above, the present disclosure is applied to the glass run 10; however, the present disclosure is not limited to this configuration and the present disclosure may be applied to all kinds of sealing members used around the door of the vehicle 1.

Thus, the embodiment as described above is merely illustrative in all respects and should not be construed as limiting. Further, all variations and modifications falling within the scope equivalent to the claims are within the scope of the present disclosure.

Although the present disclosure has been described based on the embodiment, it is understood that the present disclosure is not limited to the embodiment or structure. The present disclosure also encompasses various modifications and modifications within the equivalent range. In addition, various combinations and forms, and other combinations and forms including only one element, more than one element, or less than one element, are also within the scope and concept of the present disclosure.

According to the present disclosure, when a die-formed part is formed, an extrusion-molded part can be easily inserted into a cavity and removed from a die after forming in the die, while reducing leakage of a forming material, and the present disclosure is thus very useful in applying to a sealing member including the extrusion-molded part and the die-formed part, and a die used for forming the sealing member.

The invention claimed is:

1. A sealing member for a door of a vehicle, comprising an extrusion-molded part and a die-formed part, wherein the extrusion-molded part includes an attaching portion with a U-shaped cross section that has a protrusion portion protruding from an opposing side of the U-shape in the opposing direction and the protrusion portion is not provided in a section of the extrusion-molded part, and the die-formed part is molded so that at least a portion of which is continuous with the attaching portion by using a die including an elongated holding die that holds the extrusion-molded part so as to fit into the attaching portion, and a cavity, and by injecting a forming material into the cavity that is sealed by inserting the extrusion-molded part along a longitudinal direction of the holding die, and wherein the holding die includes a first holding portion configured to fill within the attaching portion inside the cavity to maintain a cross sectional shape of the attaching portion, a second holding portion being continuous with the first holding portion in the longitudinal direction and configured to fill within the attaching portion outside the cavity, and a guiding portion being continuous with the second holding portion in the longitudinal direction and having a cross section progressively decreasing in a direction away from the cavity, and the section of the extrusion-molded part corresponds to the second holding portion and the guiding portion.

2. The sealing member according to claim 1, wherein the extrusion-molded part is a glass run upper part configured to be installed on a frame upper part of a window frame of a vehicle, the die-formed part is a corner part connected with a rear end of the glass run upper part, the attaching portion is configured to attach to and sandwich an attachable portion protruding from the frame upper part outward of the vehicle, and the protrusion portion protrudes in the direction of sandwiching the attachable portion to be caught by a plurality of hooks provided in the attachable portion at intervals in a longitudinal direction of the attachable portion.

3. The sealing member according to claim 2, wherein the section corresponding to the second holding portion and the guiding portion has a length of less than or equal to 10 mm.

* * * * *